O. R. SCHWANTES.
SHOCK ABSORBER.
APPLICATION FILED JUNE 23, 1919.

1,333,040.

Patented Mar. 9, 1920.
2 SHEETS—SHEET 1.

Inventor
Otto R. Schwantes.
By Morsell + Keeney.
Attorneys.

O. R. SCHWANTES.
SHOCK ABSORBER.
APPLICATION FILED JUNE 23, 1919.

1,333,040.

Patented Mar. 9, 1920.
2 SHEETS—SHEET 2.

Inventor
Otto R. Schwantes
By Morsell & Keeney
Attorneys.

UNITED STATES PATENT OFFICE.

OTTO R. SCHWANTES, OF CLINTONVILLE, WISCONSIN.

SHOCK-ABSORBER.

1,333,040.   Specification of Letters Patent.   Patented Mar. 9, 1920.

Application filed June 23, 1919. Serial No. 305,986.

*To all whom it may concern:*

Be it known that I, OTTO R. SCHWANTES, a citizen of the United States, and resident of Clintonville, in the county of Waupaca and State of Wisconsin, have invented new and useful Improvements in Shock-Absorbers, of which the following is a description, reference being had to the accompanying drawings, which are a part of this specification.

My invention relates to certain new and useful improvements in shock absorbers, more particularly adapted for use in connection with motor vehicles.

The primary object of this invention is to provide a device for checking the return movement or rebound of a vehicle body under action of its springs after the same have been compressed by a sudden blow given the wheels by some unevenness in the road's surface.

Another object of the invention is to provide a shock absorber of the character above described including means for adjusting the checking action or shock absorbing qualities of the device.

A further object of the invention is to provide a shock absorber of the class described embodying a casing and oscillating piston mounted therein, said piston being constructed in a novel manner whereby to permit resistance of its movement in one direction, and its free movement in an opposite direction, and being carried by a cover closing the upper face of the casing.

A still further object of this invention is to provide a novel form of piston for the shock absorber of the class described which will have adjustable pivotal link connections with the vehicle body or chassis frame.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

Referring now more particularly to the accompanying drawing, 10 designates a vehicle body; 11, its supporting axle; 12 a supporting spring resiliently supporting said body on said axle; and 13, the supporting wheels for said axle 11.

Figure 1:
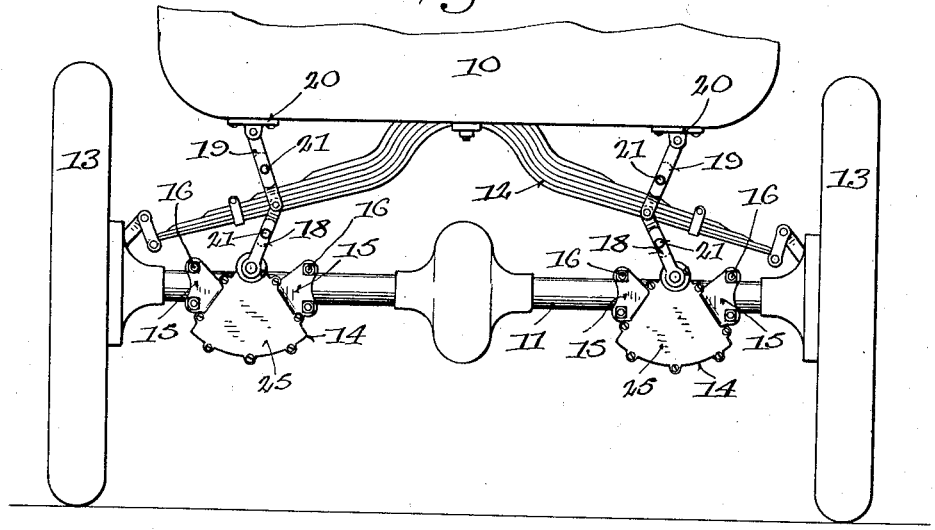
Figure 1 is a rear view of a portion of the vehicle equipped with my invention.
Figure 2:
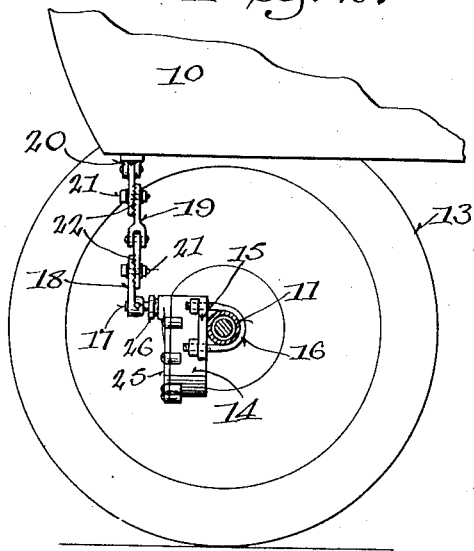
Fig. 2 is a side view of my invention illustrating the same as attached to a vehicle.

As best shown in Fig. 1, when I use my shock absorbing device in connection with the rear end of a vehicle, I dispose one near each end of the supporting axle 11 as now about to be described. My device includes a casing 14 provided with lateral ears 15 secured to the axle 11 by means of suitable clips 16. Mounted in the casing 14 is an oscillating piston to be later described, which has its operating shaft 17 disposed outwardly of the casing and has fixed thereto a two-part extensible or adjustable link 18 having its outer end in pivotal connection with a like two-part link 19 having its other end pivotally secured to a bracket 20, fixed to the vehicle body or chassis frame. The links 18 and 19 have their two sections thereof held in adjusted relation by means of binding bolts 21 retaining their serrated faces 22 in engagement.

Figure 3:
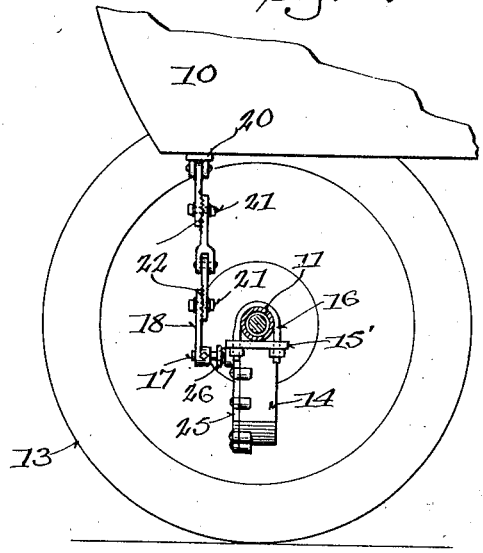
Fig. 3 is a view similar to Fig. 2 illustrating a slightly modified manner of attaching the shock absorber casing to the vehicle supporting axle.
Figure 4:
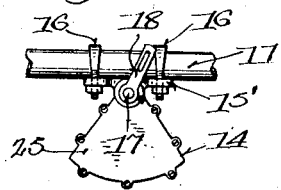
Fig. 4 is a detail view of that form of my invention depicted in Fig. 3.

In Figs. 3 and 4, I have illustrated the ears 15' as being located at the top of the casing 14 for engagement with the under side of the supporting axle 11, and as the method of securing the same thereto is identical with that just described, further description is thought unnecessary.

The casing 14 is of inverted V-shape and has its bottom walls 23 struck from an arc taken from a center in line with the longitudinal axis of the shaft 17. The shaft 17 has its inner end journaled in a boss 24 disposed in the rear flat face of the casing near its upper apex and is also journally carried by a removable cover 25 closing the open side of the casing, said cover 25 being provided with a removable packing gland 26 surrounding the shaft 17. The cover 25 has air-tight connection with the casing 14 and said casing 14 has the space therein filled with a non-compressible fluid, preferably oil.

Figure 5:
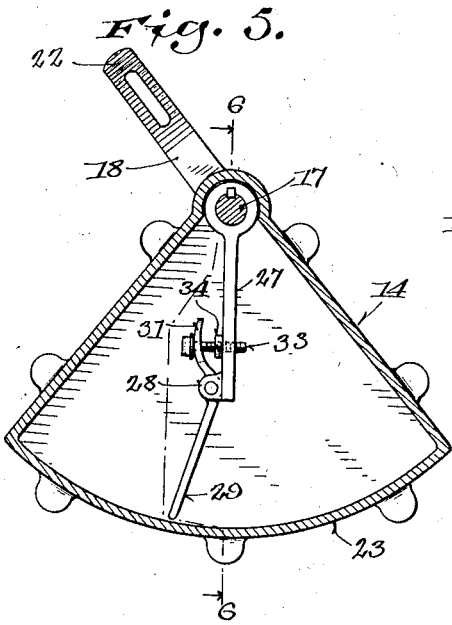
Fig. 5 is a sectional view through one of my shock absorbing devices taken on the line 5—5 of Fig. 6.
Figure 6:
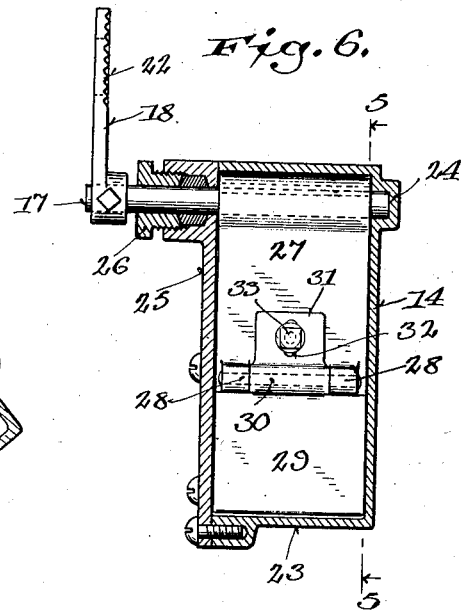
Fig. 6 is a sectional view through one of my devices taken on the line 6—6 of Fig. 5.

Referring now more particularly to Figs. 5 and 6 in which the oscillating piston disposed in the casing includes a section 27 having its upper end keyed to the shaft 17 and its lower end spaced from the curved wall 23 and provided on one face thereof near its lower end with a pair of spaced centrally apertured ears or lugs 28. Extending from the lower end of the section 23 is a gate valve or flap 29 having its upper end reduced and pivoted between the ears 28 as at 30 and having extending upwardly above its pivot an arm 31.

The arm 31 has formed therein an elongated aperture 32 engaging the shank of a bolt 33 adjustably carried by the section 27 and locked in adjusted position by means of a locking nut 34, the head of the bolt 33 and the locking nut 34 limiting the movement of the flap 29 on its pivot. The flap 29 is so arranged as to have its arm 31 normally abut the head of bolt 33 which is so adjusted as to leave but a small space between the lower end of flap 29 and the curved wall 23, whereby when the spring 12 is compressed and the piston moved to the right with reference to Fig. 5, the flap 29 will move on its pivot and increase the distance between its lower end and the curved wall and thus permit the ready flow of fluid thereby. When the springs 13 return to their normal position, they will be checked from too sudden a return by means of the arm 31 abutting the bolt head and retaining the lower end of the flap 29 in its normal position relative to the wall 23, thus permitting but a small amount of fluid to flow thereby. This checking action of the flap 29 is adjusted by means of the bolt 33 and its locking nut 34 as will be obvious.

Figure 7:
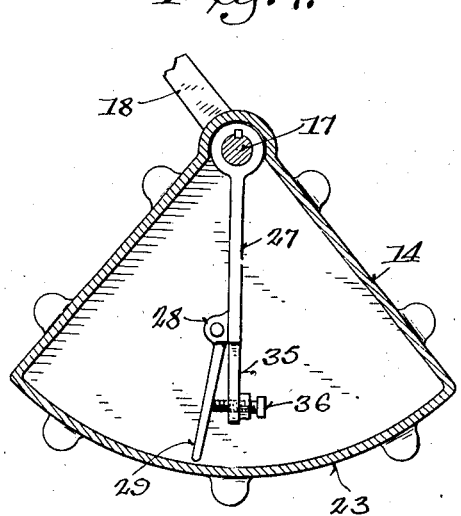
Fig. 7 is a view similar to Fig. 5 of a slightly modified form of oscillating piston.
Figure 8:
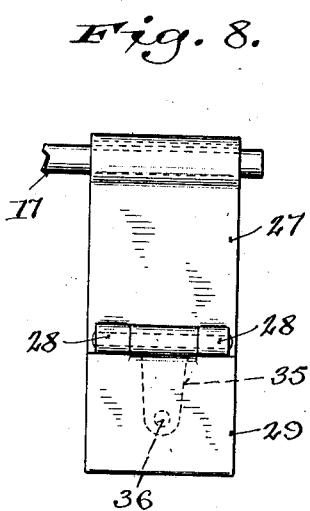
Fig. 8 is a plan view of the form of piston depicted in Fig. 7.

In the form of my invention depicted in Figs. 7 and 8, the section 27 has an arm 35 extending below the lugs 28 and carrying an adjusting screw 36 adapted to abut the flap 29. In this structure, the arm 31 is dispensed with and its place taken by means of the arm 35 of the section 27. As the operation of this form of my invention is identical with that depicted in the Figs. 5 and 6, further description is thought unnecessary.

What I claim as my invention is:

1. A shock absorber of the class described comprising a casing, an oscillating piston mounted therein, a pivoted flap carried by the piston, means for limiting the movement of said flap, and a noncompressible fluid filling the space in said casing, said flap limiting the amount of fluid passing the piston on movement thereof in one direction.

2. In a vehicle, the combination with its chassis frame and supporting axle, of a casing fixed to the axle, an oscillating piston disposed in the casing, a non-compressible fluid disposed in the casing, a two-part extensible lever having one end pivotally fixed to the chassis frame, a second two-part extensible lever having one end in pivotal connection with the other end of said first mentioned lever and its other end operatively connected with the piston, and variable means for checking the movement of the fluid past the piston in one direction to check the movement of said piston.

3. A shock absorber of the class described, comprising, a casing having one face open, a cover for the open face of the casing, a shaft journaled in the casing, an oscillating piston fixed to said shaft, a pivoted flap carried by the outer end of the piston, means limiting the movement of said flap, and a noncompressible fluid filling the space in said casing, said flap limiting the amount of fluid passing the piston on movement thereof in one direction.

4. A shock absorber of the class described, comprising, a casing, a removable cover for the casing, said casing being substantially triangular in cross section and having the side wall thereof forming its bottom curved, a shaft journally carried by the casing and casing cover and disposed at the apex of the casing disposed centrally above the curved bottom, a fluid filling the space in the casing, a piston carried by said shaft and including a lower pivoted flap adapted to check the movement of the piston in one direction by limiting the flow of fluid between its free end and the curved casing bottom, and means for moving said shaft to oscillate the piston.

5. A shock absorber of the class described, comprising, a casing of substantially inverted V-shape, the bottom wall of said casing being curved and taken from a center located at the top apex of the inverted V, a non-compressible fluid filling said casing, a shaft journally mounted in the casing and having its longitudinal axis in line with the imaginary center from which the curved bottom wall is struck, an oscillating piston carried by said shaft and having its end spaced from said curved bottom wall, a flap pivotally carried by the end of said piston and adapted to have its free end normally disposed a slight distance from the curved bottom wall, means for adjusting the relation of the free end of said flap with said curved wall, and means for rocking said shaft to oscillate said piston, said flap allowing the free flow of fluid therebeneath upon movement of the piston in one direction and checking the flow of fluid therebeneath upon movement of the piston in another direction.

In testimony whereof I affix my signature.

OTTO R. SCHWANTES.